(12) United States Patent
Tetzlaff et al.

(10) Patent No.: US 12,740,572 B2
(45) Date of Patent: Sep. 22, 2026

(54) POULTRY-PROCESSING EQUIPMENT WITH A MOUNTING CHASSIS

(71) Applicant: ARDISAM, INC., Cumberland, WI (US)

(72) Inventors: Tyler Michael Tetzlaff, Frederic, WI (US); Scott Andrew Waldal, Hudson, WI (US)

(73) Assignee: ARDISAM, INC., Cumberland, WI (US)

( * ) Notice: Subject to any disclaimer, the term of this patent is extended or adjusted under 35 U.S.C. 154(b) by 82 days.

(21) Appl. No.: 18/892,329

(22) Filed: Sep. 20, 2024

(65) Prior Publication Data

US 2026/0083140 A1 Mar. 26, 2026

(51) Int. Cl.
*A22C 21/00* (2006.01)
*A22C 21/04* (2006.01)

(52) U.S. Cl.
CPC .......... *A22C 21/04* (2013.01); *A22C 21/0046* (2013.01)

(58) Field of Classification Search
CPC . A22C 21/04; A22C 21/0046; A22C 21/0061; A22C 21/02; A22C 21/022; A22C 21/024
USPC .......................................................... 452/185
See application file for complete search history.

(56) References Cited

U.S. PATENT DOCUMENTS

| | | | | |
|---|---|---|---|---|
| 2,830,315 | A | 4/1958 | Toti | |
| 11,317,771 | B2 * | 5/2022 | Lai | B23Q 11/00 |
| 2015/0121648 | A1 * | 5/2015 | Venard | A47L 11/4072 15/341 |

OTHER PUBLICATIONS

Youtube:Bonehead Homestead . . . Kitchener Chicken Plucker: one year follow up (Year: 2023).*
Youtube: Handyman Repairs and Homesteading . . . Yardbird Homestead chicken plucker (Year: 2017).*
Youtube: Yardbird . . . Yardbird chicken plucker (Year: 2025).*
Image . . . https://sl.bing.net/cVbVaidB52W 2017 or 9 years ago (Year: 2017).*
Instruction Manual for Rotary Plucking Machine, Mitchell Engineering Food Equipment Pty Ltd., Aug. 2023, URL: https://www.mefe.com.au/content/CAT 155 4-CAT 155 6-CAT 155 8-Operating Manual.pdf.

(Continued)

*Primary Examiner* — Richard T Price, Jr.
(74) *Attorney, Agent, or Firm* — ASHURST PERKINS COIE US LLP

(57) ABSTRACT

The present technology relates to a poultry-processing machine designed to streamline and enhance the efficiency of poultry-processing operations. In some embodiments, the machine includes a chassis, a processing tub supported on the chassis, a motor mounted on the chassis or the processing tub, wheels rotatably supported on legs attached to or integral with the chassis, a handle extending upwardly from the chassis optionally above the top surface of the processing tub, a mounting plate supported on arms of the handle, and a control switch positioned on the mounting plate in electrical communication or (other communication) with the motor. In some embodiments, the handle is a multi-piece handle that can be separated into two or more pieces down to reduce the profile of the machine, which facilitates efficient packaging and storage of the machine. These features facilitate easier use and transport of the machine.

20 Claims, 4 Drawing Sheets

(56) References Cited

OTHER PUBLICATIONS

Kitchener Chicken Plucker, URL: https://www.amazon.com/KITCHENER-Stainless-Chicken-Plucker-Feather/dp/B076VW45J6, accessed Aug. 19, 2025.

LEM Stainless Steel Poultry Plucker, accessed Aug. 19, 2025, URL: https://lemproducts.com/products/stainless-steel-poultry-plucker.html.

Roots and Harvest Stainless Steel Poultry Plucker, accessed Aug. 19, 2025, URL: https://rootsandharvest.com/products/stainless-steel-poultry-plucker.html.

The Original FowlPlucker, URL: https://thefowlplucker.com/products/the-original-fowlplucker, accessed Aug. 19, 2025.

Vevor Chicken Plucker, accessed Aug. 19, 2025, URL: https://www.vevor.com/chicken-plucker-c_10943/vevor-chicken-plucker-machine-20-diameter-stainless-steel-drum-defeathering-equipment-with-108-soft-fingers-and-2-large-wheels-simple-debris-collection-500w-motor-for-efficient-poultry-plucking-p_010241503412.

Yardbird Original Chicken Plucker, accessed Aug. 19, 2025, URL: https://yardbirdpluckers.com/collections/chicken-processing/products/yardbird-chicken-plucker.

* cited by examiner

POULTRY-PROCESSING EQUIPMENT WITH A MOUNTING CHASSIS

BACKGROUND

Poultry-processing equipment is used to defeather domesticated poultry. Many users process poultry only a few times a year and do not have permanent, specialized infrastructure for the poultry-processing equipment. Existing portable processing devices, which are typically heavy, lack features to facilitate efficient movement from a storage location, such as a garage or shed, to a use location, such as a backyard. The equipment is generally unwieldy and not ergonomic to transport and operate, particularly for an individual.

The two main feather-removal or plucking-machine designs are drum-style and tub-style machines. Drum-style processing equipment includes a rotating cylinder with fingers affixed protruding perpendicularly to the axis of rotation. The rotating assembly is typically mounted horizontally. The user places the poultry carcass against the moving fingers to remove the poultry's feathers. Only one carcass at a time can be defeathered in a drum-style machine.

Tub-style plucking machines typically include an open-top, hollow cylinder orientated vertically with rubber fingers mounted to the internal diameter of the tub. The fingers project perpendicularly to the tub wall. The bottom of the tub typically includes a rotating disk with upwardly pointing fingers. The user places the carcass in the tub through the upper opening. As the bottom disk spins, it causes the carcass to rub against the stationary fingers on the tub, which removes the poultry's feathers. The user typically does not hold the carcass during use. Multiple carcasses can be defeathered at one time by a single user in a tub-style machine.

Tub-style plucking machines are typically powered by an electric motor. As a result, the cheapest and easiest location to mount an on-off switch for the motor is on a connection box affixed to the side of the motor underneath the tub. This location, however, is difficult for a user to access.

SUMMARY

The present technology relates to a poultry-processing machine designed to streamline and enhance the efficiency of poultry-processing operations. In some embodiments, the machine includes a chassis, a processing tub supported on the chassis, a motor mounted on the chassis or on the processing tub, wheels rotatably supported on legs attached to or integral with the chassis, a handle extending upwardly from the chassis optionally above the top surface of the processing tub, a mounting plate supported on arms of the handle, and a control switch positioned on the mounting plate in electrical communication or (other communication) with the motor. In some embodiments, the handle is a multi-piece handle that can be separated into two or more pieces down to reduce the profile of the machine, which facilitates efficient packaging and storage of the machine. These features facilitate easier use and transport of the machine.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

Figure 2:
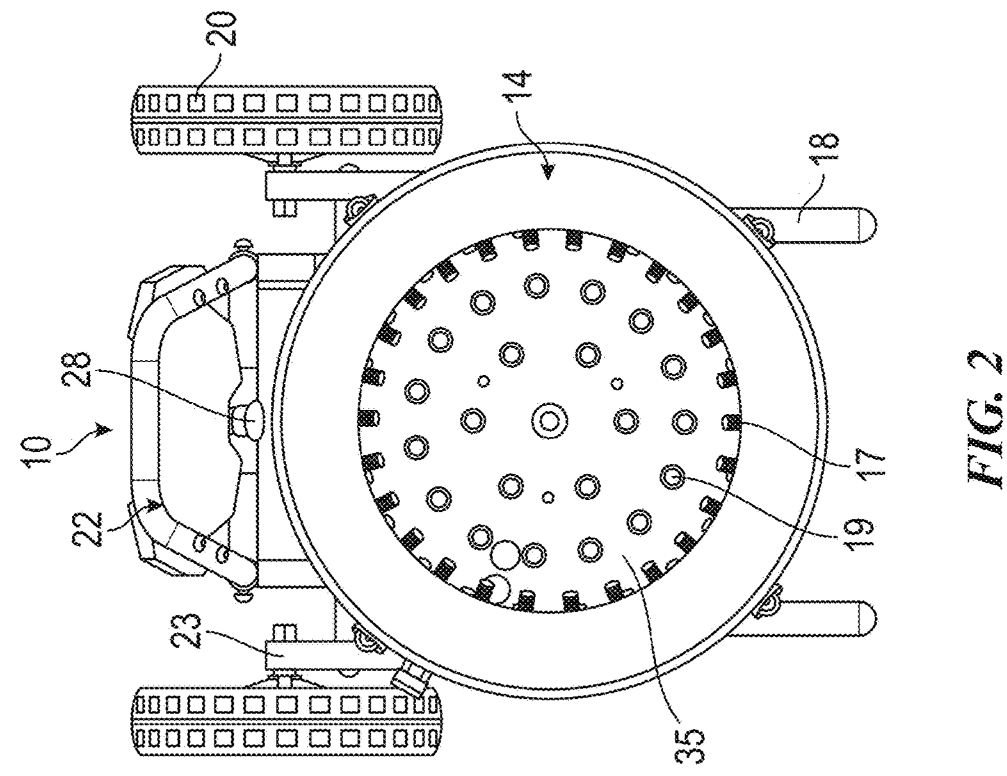
FIG. 2 is a top view of the poultry-processing machine of FIG. 1.

The present technology is directed to poultry-processing equipment. Various embodiments of the technology are described below. The following description provides specific details for a thorough understanding and enabling description of these embodiments. One skilled in the art will understand, however, that the invention may be practiced without many of these details. Additionally, some well-known structures or functions may not be shown or described in detail to avoid unnecessarily obscuring the relevant description of the various embodiments. Accordingly, embodiments of the present technology may include additional elements or exclude some of the elements described below with reference to FIGS. 1-7, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Further, unless otherwise specified, terms such as "attached" or "connected" are intended to include integral connections, as well as connections between physically separate components. Numerical adjectives including "first" and "second," as used in the present disclosure, do not convey hierarchy or specific features or functions. Rather, such numerical adjectives are intended to aid the reader in distinguishing between elements that may have similar nomenclature but that may differ in position, orientation, or structure. Accordingly, such numerical adjectives may be used differently in the claims.

Turning now in detail to the drawings, as shown in FIGS. 1-4, a poultry-processing machine 10 according to the present technology includes a chassis 12 upon which a processing tub 14 is supported. As used herein, the term "processing tub" is used to describe tubs, drums, or other suitable processing vessels that may be supported on the chassis 12.

The chassis 12 may be made of a durable metal material, such as carbon steel, stainless steel, aluminum, or cast iron, or of a plastic material, or of another suitable material. The processing tub 14 may also be made of a metal material, such as carbon steel, stainless steel, aluminum, or cast iron, or of a plastic material, or of another suitable material. The processing tub 14 may optionally be attached to the chassis 12 via clasps 16, clips, hooks, straps, carabiners, or other suitable connectors. The interior of the processing tub 14 includes inwardly protruding fingers 17 and upwardly protruding fingers 19, or similar features used to defeather poultry, as is known to those of ordinary skill in the art. As used herein, the term "machine" is used to describe the entire processing system, including the chassis, the processing tub, and other components described below.

In some embodiments, the chassis 12 is attached to one or more rear legs 23 to which wheels 20 are rotatably attached. One or more front legs 18, which support the processing machine 10 in an upright, use position, may also be attached to the chassis 12. In other embodiments, wheels may be attached to both the rear legs 23 and the front legs 18, or to only the front legs 18 and not the rear legs 23.

The rear legs 23 and front legs 18 may be attached to the chassis 12 via bolts or other suitable connectors. In other embodiments, the rear legs 23 or the front legs 18 may be integral components of the chassis 12. The rear legs 23 and front legs 18 may be made of a metal material, such as carbon steel, stainless steel, aluminum, or cast iron, or of a plastic material, or of another suitable material. As shown in FIGS. 1-4, in some embodiments, the rear legs 23 are aligned parallel to the midplane of the machine 10 to facilitate efficient transportation the processing machine 10.

The wheels 20 allow transportation of the processing machine 10 within a processing facility or between locations. The wheels 20 may be made of a rubber material, a plastic material, a metal material, or of a suitable polymeric material, such as nylon, polypropylene (PP), or acrylonitrile butadiene styrene (ABS). In some embodiments, tires may be included on the wheels. In some embodiments, the wheels 20 include through-holes 25 that reduce weight and provide an enhanced aesthetic appearance.

The front legs 18 may include rounded end portions 21 configured to rest on the ground or another surface. The wheels 20 and the front legs 18 support the chassis 12 and processing tub 14 during use. In other embodiments, the rear legs 23 may extend beyond the wheels 20 such that ends of the rear legs 23 support the machine during use, with the wheels 20 positioned slightly above the ground or other surface. In some embodiments, the wheels 20 are advantageously positioned on an outboard side of the rear legs 23 to enhance stability of the processing machine 10 during transportation and use.

Figures 3, 4:
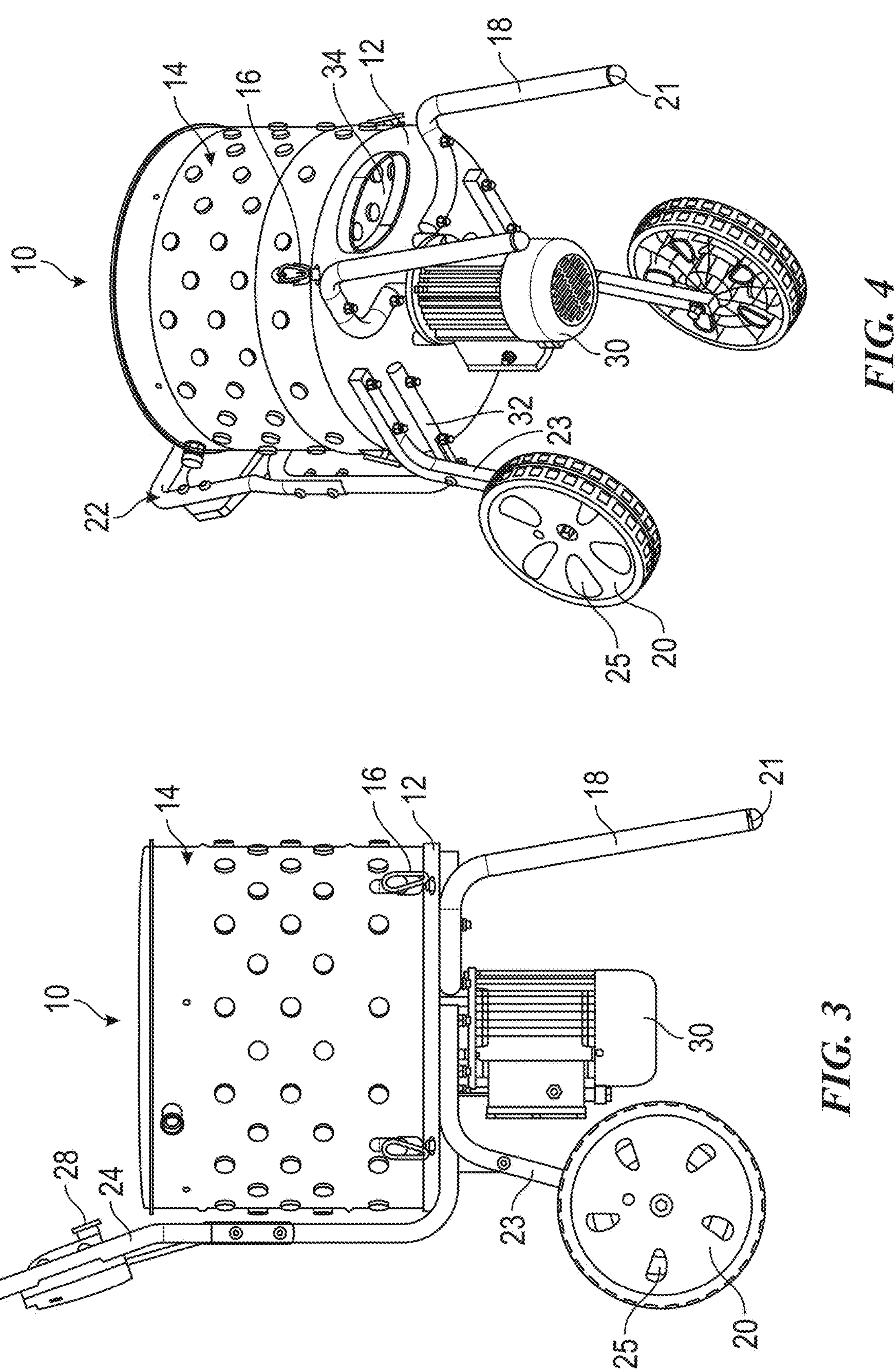
FIG. 3 is a side view of the poultry-processing machine of FIG. 1.
FIG. 4 is a bottom-perspective view of the poultry-processing machine of FIG. 1.

The processing machine 10 includes a handle 22 that optionally extends above the upper surface of the processing tub 14. As shown in FIG. 4, a lower region 32 of the handle 22 may be attached to the chassis 12 via bolts or other suitable connectors. The handle 22 may alternatively be an integral component of the chassis 12. The handle 22 may be made of a metal material, such as carbon steel, stainless steel, aluminum, or cast iron, or of a plastic material, or of another suitable material.

In some embodiments, the handle 22 extends upwardly well beyond the top surface of the processing tub 14 to facilitate ergonomic transport and operation of the processing machine 10. The handle 22, for example, may extend between 100 and 250 mm above the top surface of the processing tub 14. In other embodiments, the handle 22 extends at least 40 mm above the top surface of the processing tub 14. This extension provides a user easy access to the handle 22, as well as added leverage when tilting or transporting the processing machine 10. It also allows a user to readily view any component mounted or positioned on the handle 22 above the processing tub 14, as further described below.

Figure 1:
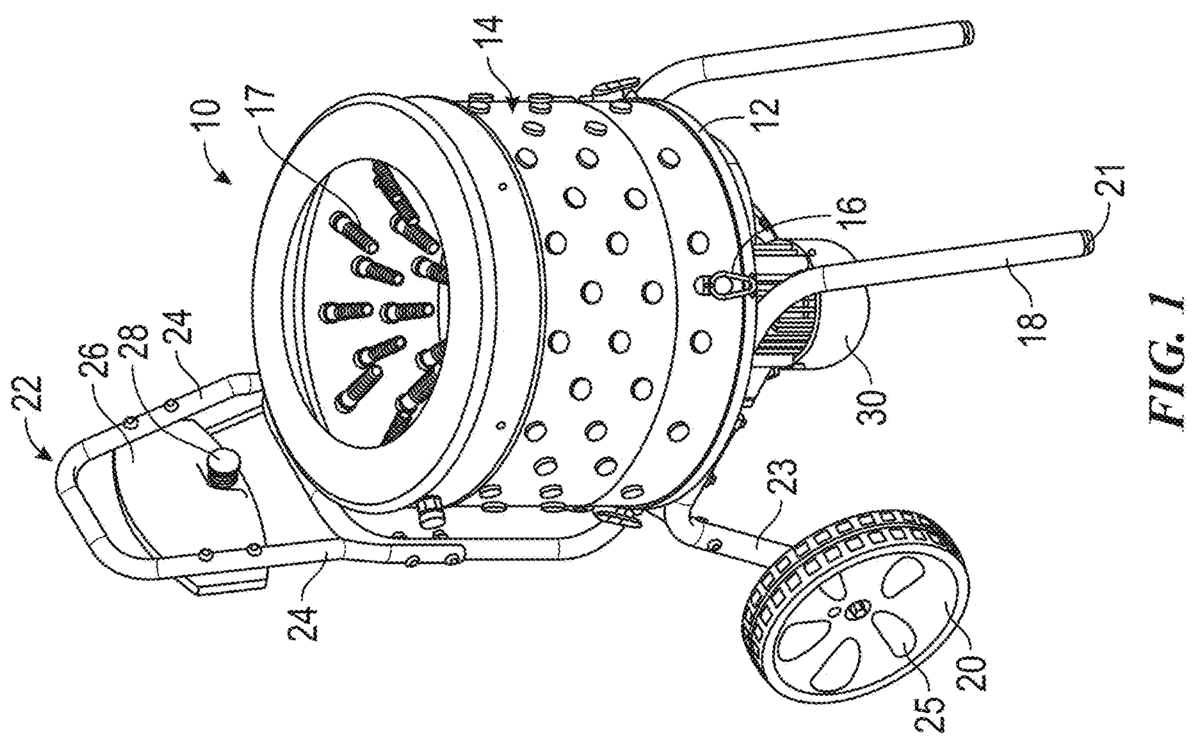
FIG. 1 is a perspective view of a poultry-processing machine, according to one embodiment.

As best shown in FIGS. 1 and 3, the handle 22 may include one or more angled or bent portions that position the top of the handle 22 away from the processing tub 22 to facilitate ergonomic transport and operation of the processing machine 10. The angled portions, for example, provide improved leverage during transport and an improved viewing angle for a user looking at any component mounted or positioned on the handle 22 above the processing tub 14, as further described below.

In other embodiments, the handle 22 may extend below (or up to) the top surface of the processing tub 14. In these embodiments, one or more components (such as an on-off switch, as described below) may be attached to the top of the handle 22, either directly or via an attachment mechanism, such that the one or more components are positioned above the processing tub 14 for easy viewing during operation of the processing tub 10.

In some embodiments, the handle 22 may include two spaced-apart arms 24 that merge into a horizontal hand-hold portion. In other embodiments, the handle 22 may include more than two arms, or may include a single arm that optionally includes a gripping portion at its distal end. Various systems and system components may be mounted on, attached to, or hung from the handle arms 24 for ease of access, viewing, and transport.

In some embodiments, a mounting plate 26, dashboard, or console may be attached via bolts or other suitable connectors to one or more of the handle arms 24. In other embodiments, the mounting plate 26 may be welded to one or more of the handle arms 24, or it may be an integral component of one or more of the handle arms 24. Various systems and system components may be mounted on, attached to, or hung from the mounting plate 26.

In some embodiments, the mounting plate 26 may be a molded component made of a plastic material, a composite material, or a suitable polymeric material, such as nylon, polypropylene (PP), acrylonitrile butadiene styrene (ABS). In other embodiments, the mounting plate 26 may be made of a suitable metal material, such as carbon steel, stainless steel, aluminum, cast iron, or of another suitable material.

In some embodiments, operating controls or displays, such as a touch-screen display, may be supported on the handle 22 or on the mounting plate 26. In some embodiments, an on-off switch 28, such as a push-action switch, is supported on the mounting plate 26, such that it is indirectly attached to the handle. In other embodiments, the on-off switch 28 may be attached to the top of the handle 22, either directly or via an attachment mechanism, such that the on-off switch 28 is positioned above the processing tub 14 for easy access during operation of the processing tub 10.

The on-off switch 28, and any other controls or displays supported on the handle 22 or the mounting plate 26, are preferably positioned above the upper surface of the processing tub 14, facing forward toward the processing tub 14, for easy user access and viewing during processing. Existing poultry-processing machines, conversely, typically position an on-off switch, for example, below the top surface of the processing tub (near a motor) or facing in a rearward direction, which makes accessing the switch difficult for the user.

In some embodiments, the handle 22 may be constructed of two or more separable pieces to give the machine a smaller profile when the pieces are separated. This smaller profile facilitates positioning the poultry-processing machine 10 in smaller packaging than could otherwise be used if the handle 22 were a single, unremovable piece. It also makes the machine 10 smaller for storage. The separable handle pieces—which may be formed, concentric, crushed tubes, or other suitable structures—may be attached to each other via bolts or other suitable connectors. In another embodiment, the multiple handle pieces may have a telescoping relationship such that the upper portion of the handle slides into or over the lower portion of the handle for efficient packaging and storage.

A motor 30 that drives one or more components of the processing tub 14, such as a rotating disk 35 at the base of the processing tub 14, may be bolted or otherwise attached to a bottom of the chassis 12. The motor 30 may include an output shaft that passes through an opening in the chassis 12 to engage the rotating disk. The output shaft may be bolted or otherwise attached to the rotating disk 35. In other embodiments, such as embodiments in which the processing tub 14 is not removable from the chassis 12, the motor 30 may be bolted or otherwise attached directly to the processing tub 14.

In some embodiments, the motor 30 may be electrically connected to the on-off switch 28 via an electrical cord. In other embodiments, the switch 28 may be remotely connected to the motor via Wi-Fi, Bluetooth®, or another suitable wireless-connection mechanism. The motor 30 is preferably an electric motor, which may include a corded plug for powering via an electrical outlet. In other embodiments, the motor 30 may be powered by one or more batteries, which may optionally be rechargeable.

As shown in FIG. 4, in some embodiments, the processing tub 14 includes a discharge opening 34 or chute in or on its bottom surface. The discharge opening 34 may be positioned along the midplane of the machine 10 forward of the motor. In other embodiments, the discharge opening 34 may be positioned in other suitable locations.

To use the processing machine 10, a user grasps the horizontal portion of the handle 22 and pushes it downward to raise the front legs 18 off the ground or other surface. The user may then pull or push the processing machine 10 to a desired processing location. When processing is completed, the user can repeat these steps to return the processing machine 10 to its storage location.

Figure 5:
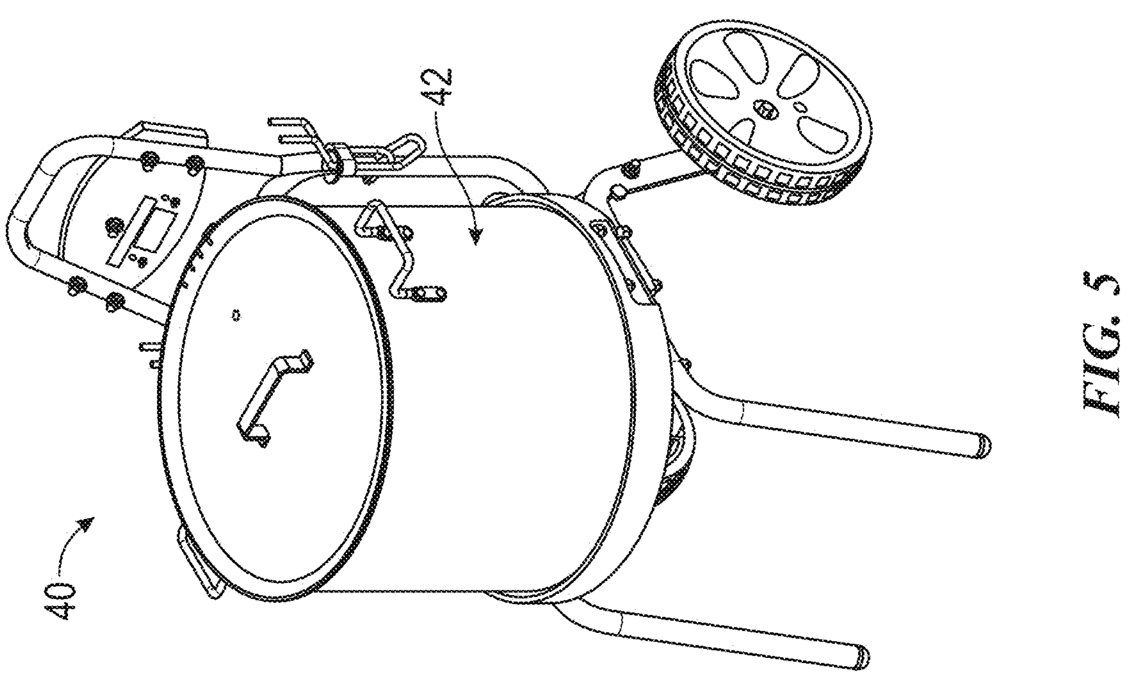
FIG. 5 is a perspective view of a poultry-scalding machine, according to one embodiment.

Turning to FIG. 5, other devices may be supported on a chassis similar to or the same as the one shown in FIGS. 1-4. As one example, a poultry-processing, poultry-scalding machine 40 includes a scalding vessel 42 used to soak a slaughtered poultry in hot water before removal or plucking of feathers. The hot water increases the removability of the feathers from the poultry. As noted above, the term "processing tub" includes any vessel that may be supported on the chassis 12 (or a similar chassis), such as the processing tub 14 or the scalding vessel 42.

In use, a gas burner, electric heating element, induction heater, or other heating apparatus or method is used to heat water in the scalding vessel 42 to a specific temperature. A controller, switch, or other device that operates the heating components, such as gas-burner ignition components or electrical-heating components, may be attached to or supported on the mounting plate. After heating the water, a user submerges a poultry in the hot water inside the scalding vessel 42. After the scalding process is completed, the poultry is placed into a plucking device, such as the processing machine 10 shown in FIGS. 1-4, for feather removal. In some embodiments, the scalding machine 40 with the scalding vessel 42 may be used as a portable outdoor cooker to boil foods such as sweetcorn, fish, or crawdad. It may also be used to finish maple syrup, and could optionally be used as a water-bath canner.

Figure 6:
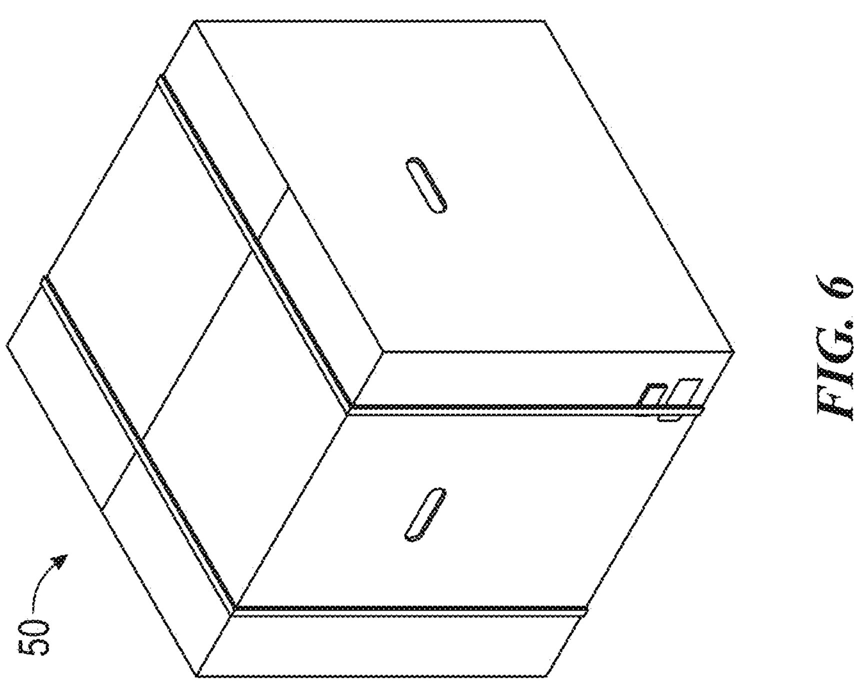
FIG. 6 is a perspective view of a package for a poultry-processing or poultry-scalding machine.

As discussed above, in embodiments in which a two-piece or multi-piece handle 22 is used, the processing machine can be broken down for efficient packaging and storage. FIG. 6 illustrates an example of a package 50 used to ship and store a processing machine 10. In some embodiments, the package 50 may be approximately 563 mm long, by 563 mm wide, by 521 mm high, but any dimensions suitable to accommodate the size of a given processing machine may alternatively be used.

Figure 7:
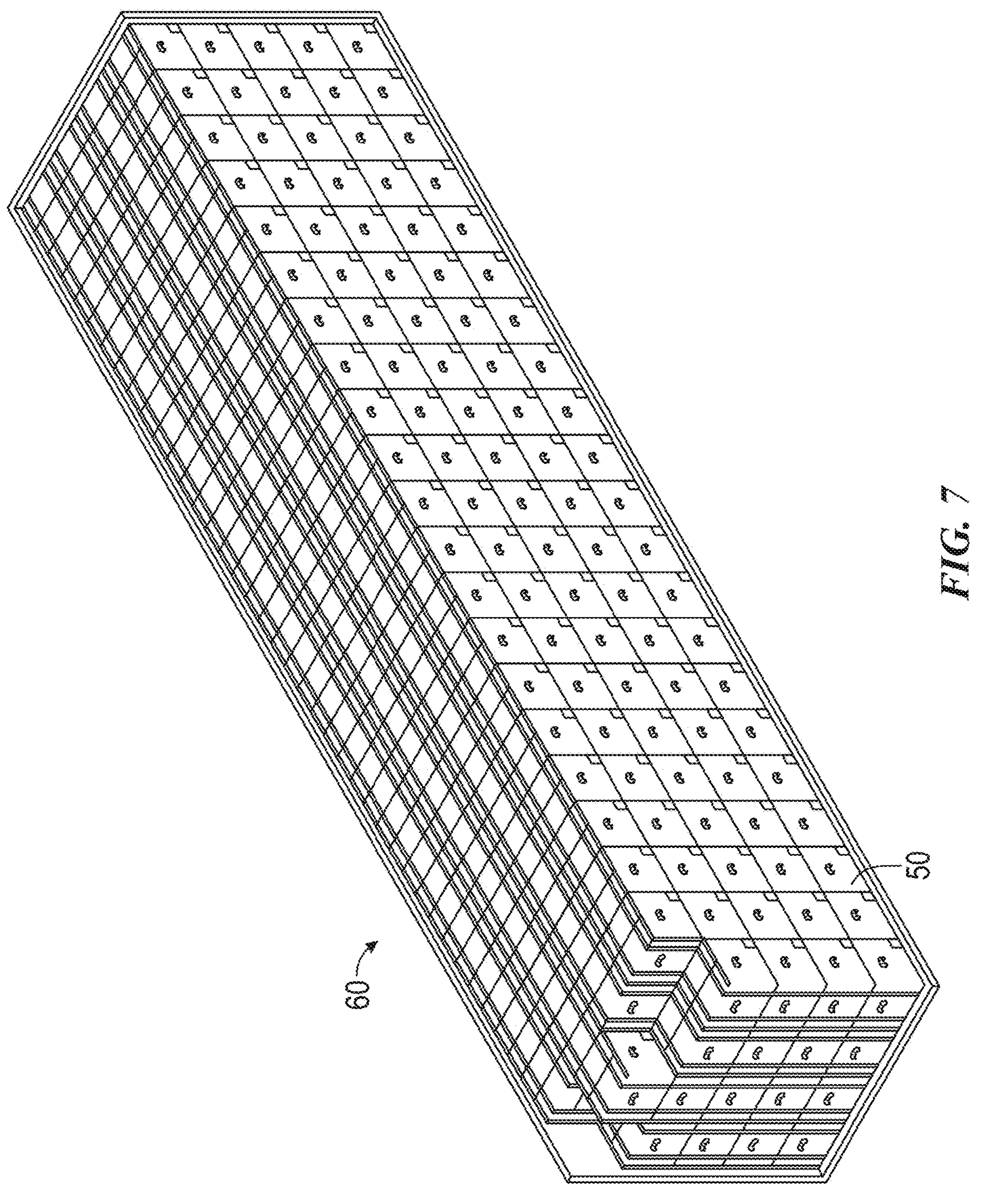
FIG. 7 is a perspective view of a shipping container containing several packages, such as the package illustrated in FIG. 6.

FIG. 7 illustrates a shipping container 52 containing several processing-machine packages 50. The shipping container 52 may be a standard freight container having a length of 12,025 mm, a width of 2350 mm, and a height of 2695 mm, or it may have other suitable dimensions. Minimizing the size of the packages 50 by using processing machines 10 with two-piece (or multi-piece) handles 22 facilitates filling a shipping container 52 with the least amount of wasted space.

The processing machines 10, 40 described herein have several advantages. For example, the handle 22 extending well beyond the upper surface of the processing tub 14 or scalding vessel 42 allows a user to tip the processing machine 10 or 40 such that it is supported on the wheels 20 for easy, ergonomic transport. The extended handle 22 also allows for the optional mounting plate 26 on which a control switch 28 and accessories may be mounted, supported, or hung. Because the handle 22 is attached to the chassis 12 (as opposed to the tub), the processing tub 14 or scalding vessel 42 may be removed while the handle 22 and any controls or accessories remain with the chassis 12. Thus, the controls and transportability features are not affected when the processing tub 14 or scalding vessel 42 is removed.

Further, the combination of the chassis 12 and the handle 22 provides support for the processing tub 14 or scalding vessel 42 during transport, which is particularly useful in embodiments in which the processing tub 14 or scalding vessel 42 is not fastened to the chassis 12. And, as discussed above, embodiments in which a two-piece (or multi-piece) handle are used allow for efficient packaging and storage of the machine.

The present technology provides an improved, efficient poultry-processing machine. Embodiments of the present technology may include kits of parts comprising any quantity or combination of any of the components described herein.

From the foregoing, it will be appreciated that specific embodiments of the presently disclosed technology have been described herein for purposes of illustration, but that various modifications may be made without deviating from the scope of the technology.

Certain aspects of the technology described in the context of particular embodiments may be combined or eliminated in other embodiments. Further, while advantages associated with certain embodiments of the presently disclosed technology have been described in the context of those embodiments, other embodiments may also exhibit such advantages, and not all embodiments need necessarily exhibit such advantages to fall within the scope of the technology. Further, the poultry-processing machine may include additional features not described herein. Accordingly, the disclosure and associated technology may encompass other embodiments not expressly shown or described herein.

What is claimed is:

1. A poultry-processing machine, comprising:

a chassis;

a processing tub supported on the chassis;

at least one leg attached to the chassis;

at least one wheel rotatably supported on the at least one leg; and a handle comprising multiple handle sections removably attachable to each other, wherein a first handle section of the multiple handle sections is attached to the chassis, and a second handle section of the multiple handle sections, when attached, extends above a top surface of the processing tub.

2. The poultry-processing machine of claim 1 wherein the second handle section is removably attachable to the first handle section.

3. The poultry-processing machine of claim 1 further comprising a third handle section of the multiple handle sections, wherein the third handle section is positionable between, and removably attachable to, the first handle section and the second handle section.

4. The poultry-processing machine of claim 1 wherein the processing tub comprises a scalding vessel.

5. The poultry-processing machine of claim 1 further comprising a mounting plate attached to the handle and positioned above the top surface of the processing tub.

6. The poultry-processing machine of claim 5 further comprising a motor mounted on the chassis or the processing tub, wherein a control switch in communication with the motor is supported on the mounting plate.

7. The poultry-processing machine of claim 6 wherein the communication between the control switch and the motor comprises an electrical connection.

8. The poultry-processing machine of claim 6 wherein the communication between the control switch and the motor comprises a wireless connection.

9. The poultry-processing machine of claim 1 wherein the handle includes a first arm and a second arm spaced apart from the first arm, wherein the first arm and the second arm join to form a hand-hold portion in the second section of the handle.

10. The poultry-processing machine of claim 9 further comprising a mounting plate attached to at least one of the first arm or the second arm of the handle.

11. The poultry-processing machine of claim 1 wherein the at least one leg comprises a first leg on which a first wheel of the at least one wheel is rotatably supported, and a second leg on which a second wheel of the at least one wheel is rotatably supported.

12. The poultry-processing machine of claim 11 wherein the at least one leg further comprises a third leg and a fourth leg that support the chassis in an operating position.

13. The poultry-processing machine of claim 1, wherein the handle includes at least one bend that positions a distal portion of the second handle section away from the processing tub.

14. A poultry-processing machine, comprising:

a chassis;

a processing tub supported on the chassis;

a first leg attached to the chassis;

a first wheel rotatably supported on the first leg;

a second leg attached to the chassis;

a second wheel rotatably supported on the second leg; and a handle attached to the chassis.

15. The poultry-processing machine of claim 14 further comprising a control switch attached to the handle, wherein the control switch is positioned above a top surface of the processing tub.

16. The poultry-processing machine of claim 15, wherein the handle does not extend above a top surface of the processing tub.

17. The poultry-processing machine of claim 16 further comprising a motor mounted on the chassis or the processing tub, wherein the control switch controls the motor.

18. The poultry-processing machine of claim 15 further comprising a mounting plate attached to the handle, wherein the control switch is supported on the mounting plate such that the control switch is indirectly attached to the handle.

19. The poultry-processing machine of claim 14, wherein the handle comprises a first section attached to the chassis, and a second section removably attachable to the first section and extending above a top surface of the processing tub.

20. A poultry-processing machine, comprising:

a chassis;

means for processing poultry supported on the chassis;

support means attached to the chassis; and means for providing ergonomic transport of the machine attached to the chassis.

* * * * *